(12) United States Patent
Iwasa et al.

(10) Patent No.: US 7,910,201 B2
(45) Date of Patent: *Mar. 22, 2011

(54) POROUS RESIN FILM AND INK JET RECORDING MEDIUM

(75) Inventors: Yasuo Iwasa, Ibaraki (JP); Shigekazu Oi, Ibaraki (JP)

(73) Assignee: Yupo Corporation, Tokyo (JP)

( * ) Notice: Subject to any disclaimer, the term of this patent is extended or adjusted under 35 U.S.C. 154(b) by 1058 days.

This patent is subject to a terminal disclaimer.

(21) Appl. No.: 09/841,486

(22) Filed: Apr. 25, 2001

(65) Prior Publication Data

US 2002/0028320 A1    Mar. 7, 2002

(30) Foreign Application Priority Data

Apr. 25, 2000  (JP) ................. 2000-124021

(51) Int. Cl.
 *B32B 5/22* (2006.01)
 *B41M 5/40* (2006.01)
(52) U.S. Cl. ............... 428/317.9; 428/315.7; 428/316.6; 428/319.3; 428/319.7; 428/319.9; 428/32.17; 428/32.18
(58) Field of Classification Search ............ 428/317.9, 428/315.7, 304.4, 32.17, 32.21, 32.26, 32.27, 428/32.28, 32.34, 32.36, 315.5, 315.9, 516
See application file for complete search history.

(56) References Cited

U.S. PATENT DOCUMENTS

| | | | | |
|---|---|---|---|---|
| 4,506,037 A | * | 3/1985 | Suzuki et al. | 427/180 |
| 4,686,118 A | * | 8/1987 | Arai et al. | 427/261 |
| 5,059,630 A | * | 10/1991 | Fujita et al. | 264/49 |
| 6,086,987 A | * | 7/2000 | Yamanaka et al. | 423/419.1 |
| 6,136,425 A | * | 10/2000 | Akiyama et al. | 428/314.2 |
| 6,402,316 B1 | * | 6/2002 | Ichinose | 347/101 |
| 6,632,487 B1 | * | 10/2003 | Arai et al. | 428/32.21 |
| 6,811,837 B2 | * | 11/2004 | Iwasa et al. | 428/32.17 |
| 6,911,253 B2 | * | 6/2005 | Iwasa et al. | 428/317.9 |
| 6,984,423 B2 | * | 1/2006 | Iida et al. | 428/32.17 |

FOREIGN PATENT DOCUMENTS

| | | | |
|---|---|---|---|
| JP | 9-95044 A | | 4/1997 |
| WO | WO 9946117 A1 | * | 9/1999 |
| WO | 00/22033 A1 | | 4/2000 |
| WO | WO 0022033 A1 | * | 4/2000 |
| WO | WO 0140361 A1 | * | 6/2001 |
| WO | WO 0142341 A1 | * | 6/2001 |

OTHER PUBLICATIONS

English Abstract "Recording Sheet and Production Thereof," Takeshi Fujita, Aug. 1, 1995.*
Japanese Office Action dated May 12, 2009.

* cited by examiner

*Primary Examiner* — Hai Vo
(74) *Attorney, Agent, or Firm* — Sughrue Mion, PLLC

(57) ABSTRACT

A porous resin film which is obtained from a compound prepared by kneading a composition comprising 30 to 100% by weight of a thermoplastic resin comprising a hydrophilic thermoplastic resin and 0 to 70% by weight of an inorganic and/or an organic powder in an intermeshing twin-screw extruder at a screw shear rate of 300 $sec^{-1}$ or higher and which has a liquid absorbing capacity of 0.5 $ml/m^2$ or more as measured in accordance with the method specified in Japan TAPPI Standard No. 51-87.

19 Claims, No Drawings

POROUS RESIN FILM AND INK JET RECORDING MEDIUM

FIELD OF THE INVENTION

This invention relates to a porous resin film having excellent aqueous liquid or ink absorptivity and to a recording medium comprising the porous resin film, particularly an ink jet recording medium.

BACKGROUND OF THE INVENTION

Water-resistant synthetic papers mainly comprising resins have found their use chiefly in offset printing or seal printing using oily inks or UV-curing inks and sublimation or melt type thermal transfer. With broadening of application, there has been an increasing demand for synthetic papers suited to printing with aqueous inks and application of environmentally friendly aqueous pastes, that is, synthetic papers exhibiting satisfactory absorbing properties for aqueous ink, aqueous pastes or water as a medium thereof.

Aided by recent technical advances in multimedia, ink jet printers have become wide spread in both business and domestic use. Ink jet printers have many merits, such as adaptability for multicolor printing, capability of forming large images, and low printing cost. In particular, ink jet printers using aqueous inks have supplanted those using oily inks in view of environmental and safety considerations.

Ink jet printers have now found wide use as a means for obtaining hard copies not only from word processors but from image processors as well. It has therefore been required for printed images to have more precision. Image precision depends on drying properties of ink applied to recording media. For example, when a plurality of recording sheets are printed and superposed on top of another in succession, the printed ink may cause offset to stain the image if the recording sheets have insufficient ink absorptivity.

To improve image precision, it is a commonly followed practice to coat a recording medium, such as synthetic paper, plastic film or pulp paper, with an ink receptive material containing a hydrophilic resin or inorganic fine powder (see, for example, JP-A-3-82589 and JP-A-9-216456) Ink jet recording media having an ink receptive layer mainly comprising a synthetic resin provided by thermal lamination or extrusion lamination have also been proposed (see JP-A-8-12871, JP-A-9-1920 and JP-A-9-314983). However, pulp paper coated with an ink receptive layer is liable to develop surface unevenness on the printed surface where a large amount of ink is ejected. Because plastic films coated with an ink receptive layer tend to lack enough absorptivity when a large amount of ink is ejected, the coating must have an increased thickness, requiring a number of coating operations.

Accordingly, an object of the present invention is to solve the above problems associated with the related art by providing a porous film having satisfactory absorptivity for water as a solvent of aqueous ink or aqueous paste.

Another object of the invention is to provide a recording medium, especially an ink jet recording medium, which uniformly absorbs aqueous ink without causing ink density unevenness even when solid areas are printed with a large amount of ejected ink.

SUMMARY OF THE INVENTION

As a result of extensive investigation, the present inventors have found that a porous resin film obtained from a compound which is prepared by kneading a thermoplastic resin comprising a water-soluble or water-swelling hydrophilic thermoplastic resin and, if desired, an inorganic and/or an organic fine powder at a shear rate of at least 300 sec$^{-1}$ or a laminate having the porous resin film as a surface layer exhibits satisfactory absorptivity for an aqueous liquid. They have also found that a porous resin film having a liquid absorbing capacity of 0.5 ml/m$^2$ or more as measured in accordance with the method specified in Japan TAPPI Standard No. 51-87 is capable of absorbing ink without causing ink density unevenness even when a large amount of ink is ejected and is therefore suitable as an ink jet recording medium. The present invention has been completed based on these findings.

The present invention provides a porous resin film which is obtained from a compound prepared by kneading a composition comprising 30 to 100% by weight of a thermoplastic resin comprising a hydrophilic thermoplastic resin and 0 to 70% by weight of an inorganic and/or an organic fine powder in an intermeshing twin-screw extruder at a screw shear rate of 300 sec$^{-1}$ or higher and which has a liquid absorbing capacity of 0.5 ml/m$^2$ or more as measured in accordance with the method specified in Japan TAPPI Standard No. 51-87.

The present invention also provides a laminate comprising a base layer having on at least one side thereof the above-described porous resin film as a printable surface layer. The present invention furthermore encompasses a liquid absorber and a recording medium comprising the porous resin film or the laminate, particularly a recording medium for ink jet recording comprising the porous resin film or the laminate and a colorant fixing layer.

The porous resin film of the present invention exhibits high absorptivity for an aqueous solvent or aqueous ink. The recording medium comprising the porous resin film of the invention forms precise images free from ink density unevenness even when printed with a large amount of ink ejected from an ink jet. Accordingly, the porous resin film and the recording medium of the invention are suited to a wide variety of applications including ink jet recording media.

DETAILED DESCRIPTION OF THE INVENTION

The compound for making the porous resin film is prepared by kneading a thermoplastic resin comprising a hydrophilic thermoplastic resin and, if desired, an inorganic and/or an inorganic powder at a screw shear rate of 300 sec$^{-1}$ or higher, preferably 500 to 25,000 sec$^{-1}$, more preferably 800 to 15,000 sec$^{-1}$. If the screw shear rate is lower than 300 sec$^{-1}$, the hydrophilic thermoplastic resin is not sufficiently dispersed, resulting in poor liquid absorptivity.

The term "screw shear rate" as used herein refers to the slope of the velocity in the clearance between the outer circumference of a screw and the inner wall of the barrel of an extruder (hereinafter simply referred to as a screw clearance). While depending on the screw clearance, a screw revolution speed of 100 to 1,500 rpm generally produces a sufficient shear rate. The screw shear rate is calculated by multiplying the circumference depicted by the screw periphery by the number of revolutions per second and dividing the product by the screw clearance.

The twin-screw extruder which can be used in the present invention includes co-rotating intermeshing twin-screw ones and counter-rotating intermeshing ones, with co-rotating intermeshing twin-screw extruders being preferred.

The porous resin film has a liquid absorbing capacity of 0.5 ml/m$^2$ or more, preferably 3 to 2600 ml/m$^2$, more preferably 6 to 100 ml/m$^2$. For use as a recording medium to be recorded with aqueous ink, it is particularly preferred for the porous resin film to have a liquid absorbing capacity of 6 to 50 ml/m². If the liquid absorbing capacity is less than 0.5 ml/m², the porous resin film exhibits insufficient absorption for aqueous ink or aqueous paste. Since the liquid absorptivity of the porous resin film also depends on the film thickness, the upper limit of the liquid absorbing capacity will be decided according to end use with the film thickness taken into consideration.

The "liquid absorbing capacity" is measured according to Japan TAPPI Standard, No. 51-87 (Pater Pulp Test No. 51-87 (Bristow's method)). In the present invention, the liquid absorptivity of a film is represented by a "liquid absorbing capacity" measured at 2 seconds (absorption time) unless otherwise specified. The measurement is made by using a 70 wt. % water/30 wt. % ethylene glycol mixed solvent containing about 2 parts by weight of a staining dye, such as Malachite Green, per 100 parts by weight of the mixed solvent. The kind and the amount of the staining dye are not particularly limited as long as the surface tension of the mixed solvent is not noticeably affected. The measurement is made with, for example, a liquid absorption tester supplied by Kumagaya Riki Kogyo K. K.

In order to prevent squeeze-out of aqueous paste, etc., it is preferred for the porous resin film to exert high liquid absorbing properties in a shorter absorption time. It is preferred for the porous resin film to achieve a liquid absorbing capacity of 0.8 ml/m² or more, particularly 1 to 500 ml/m², within an absorption time of 40 milliseconds.

A porous resin film having a higher rate of liquid absorption, which can be measured simultaneously with the measurement of liquid absorbing capacity, tends to give better results in absorption and drying of overprints. The porous resin film of the present invention usually shows an absorption rate of 0.02 ml/{m²•(ms)$^{1/2}$} or greater, preferably 0.1 to 100 ml/{m²•(ms)$^{1/2}$}, between 20 ms and 400 ms.

It is preferred for the porous resin film to have a surface contact angle with water of 110° or less, preferably 20 to 100°, more preferably 20 to 80°. For use as an ink jet recording medium, a contact angle of 45 to 80° is preferred. The water contact angle of 110° or less is desirable for achieving a good level of penetrability for aqueous ink, aqueous paste, etc. In some cases the water contact angle is selected according to the kind of ink for optimizing the balance between spreadability of aqueous ink droplets to directions parallel to the film surface and penetrability in the film thickness direction.

The water contact angle of the film surface is measured with a commercially available contact angle meter (eg., CA-D, supplied by Kyowa Kaimen Kagaku K. K.) 1 minute after dropping pure water on the film surface. The measurement is repeated 10 times using an intact film for every measurement to obtain an average (n=10). There is a tendency that the porous resin film having a smaller difference between the maximum and minimum water contact angles in the measurement repeated 10 times shows more uniformity in absorbing aqueous ink or any other liquids comprising an aqueous medium, providing higher printing quality, The difference between the maximum and minimum water contact angles is within 30°, preferably within 20°, more preferably within 15°.

The porous resin film has fine pores on its surface, through which aqueous ink or any other aqueous liquid applied thereto is absorbed. The number or shape of the pores existing on the porous resin film surface can be determined by electron microscopic observation. Specifically, a piece cut out of a porous resin film is fixed on a mount, gold, gold-palladium, etc. is deposited on the surface to be observed, and the pores on the film surface are observed under an electron microscope (e.g., a scanning electron microscope S-2400, available from Hitachi, Ltd.) at an arbitrary magnification to identify the number, the size, and the shape of the pores. The number of pores observed in the field is converted to the number of pores per unit area. The porous resin film preferably has $1\times10^6$ or more pores per m². For securing quick absorption for aqueous liquids, $1\times10^8$ or more pores per m² are preferred. For securing the surface strength, the number of pores on the surface is preferably not more than $1\times10^{15}$, more preferably $1\times10^{12}$, per m².

The porous resin film has a porous structure having fine pores not only on its surface but in the inside. From the standpoint of securing improved absorbing and drying properties for aqueous ink, it is preferred for the porous resin film to have a porosity of 10% or more, particularly 20 to 75%, especially 30 to 65%. A porosity of 75% or less secures satisfactory film strength. Existence of internal pores can be confirmed by observing a cut area of the film under an electron microscope.

The term "porosity" as used herein means an area ratio of voids (pores) in a cut area of a sample film observed under an electron microscope, which is represented by equation;

$$\text{Porosity (\%)} = (\rho_0 - \rho)/\rho_0 \times 100$$

wherein $\rho_0$ is the true density of the porous resin film; and $\rho$ is the density of the porous resin film.

Specifically, a porous resin film embedded in an epoxy resin is sliced with a microtome in the direction parallel to the thickness direction and perpendicular to the planar direction, and the cut area is metallized and observed under a scanning electron microscope at an arbitrary magnification suitable for observation, e.g., at 500 to 2000 times magnification, or the electron microgram of the metallized cut area is image-analyzed to obtain the porosity. In an example, the pores are traced on a tracing film as solid images, which are processed on an image analyzer (e.g., Luzex IID, supplied by Nireco Corp.) to obtain the area ratio (%) of pores.

The porosity of a porous resin film in a laminate can also be obtained by calculating the thickness and the basis weight (g/m²) of the porous resin film from the thickness and the basis weight of the laminate and those of the layer (s) of the laminate having the porous resin film removed therefrom, obtaining the density ($\rho$) of the porous resin film, obtaining the non-pore area density ($\rho_0$) from the same but non-porous composition as the porous resin film, and applying the resulting values to the above equation.

The shape and size of the inside pores can be observed under a scanning electron microscope at a magnification easy for observation, e.g., 200 to 2000 times magnification. The size of the inside pores is represented by an average of diameters of at least 10 inside pores measured in the planar and thickness directions.

The porous resin film of the invention comprises 30 to 100% by weight of a thermoplastic resin comprising a hydrophilic thermoplastic resin and 0 to 70% by weight of an inorganic and/or an organic fine powder.

The thermoplastic resin can be a mixture of a hydrophilic thermoplastic resin and a non-hydrophilic thermoplastic resin or consist solely of a hydrophilic thermoplastic resin. The thermoplastic resin is preferably a mixture of a hydrophilic thermoplastic resin and a non-hydrophilic thermoplastic resin. The mixture preferably comprises 5 to 100 parts by weight, particularly 10 to 60 parts by weight, of a hydrophilic thermoplastic resin per 100 parts by weight of a non-hydrophilic thermoplastic resin.

The non-hydrophilic thermoplastic resin which can be used in the porous resin film includes polyolefin resins, such as ethylene resins (e.g., high-density polyethylene, middle-density polyethylene, and low-density polyethylene) and propylene resins; polymethyl-1-pentene, ethylene-cyclicolefin copolymers; polyamide resins, such as nylon-6, nylon-6,6, nylon-6,10, nylon-6,12, and nylon-6,T; thermoplastic polyester resins, such as ethylene terephthalate homo-or copolymers, polyethylene naphthalate, and aliphatic polyesters; and other thermoplastic resins, such as polycarbonate, atactic polystyrene, syndiotactic polystyrene, and polyphenylene sulfide. These thermoplastic resins can be used either individually or as a combination of two or more thereof.

Of these non-hydrophilic thermoplastic resins, polyolefin resins, such as ethylene resins and propylene resins, particularly propylene resins, are preferred from the standpoint of chemical resistance, low specific gravity, and cost. Suitable propylene resins include isotactic or syndiotactic homopolypropylene. Propylene copolymers comprising propylene and an α-olefin, e.g., ethylene, 1-butene, 1-hexene, 1-heptene, and 4-methyl-1-pentene, having various stereo specificity are also useful. The propylene copolymers may be bipolymers, terpolymers or polymers comprising four or more monomer units and maybe random copolymers or block copolymers. The propylene resin is preferably used in combination with 2 to 25% by weight of a resin having a lower melting point than a propylene homopolymer, such as high-density or low-density polyethylene.

The hydrophilic thermoplastic resins which can be used in the present invention are not particularly limited as long as they dissolve in water or swell with water and exhibit plasticity at room temperature or higher temperatures. Useful hydrophilic thermoplastic resins include vinyl resins, such as polyvinyl alcohol and its copolymers and crosslinked products thereof, polyvinylpyrrolidone and its copolymers; acrylic resins, such as homo-or copolymers of esters of acrylic acid, methacrylic acid or maleic acid having a hydroxyalkyl group, e.g., a 2-hydroxyethyl group or a 2-hydropropyl group, and crosslinked products thereof, polyacrylamide and its copolymers, hydrolyzates of acrylonitrile polymers or crosslinked acrylonitrile polymers, homo-or copolymers of acrylic acid or methacrylic acid and crosslinked products thereof, and salts of these acrylic resins (e.g., sodium salts, potassium salts, lithium salts, and primary, secondary, tertiary or quaternary ammonium salts); homo-or copolymers of maleic acid and crosslinked products thereof and salts thereof (e.g., sodium salts, potassium salts, lithium salts, and primary, secondary, tertiary or quaternary ammonium salts), hydrolyzates of vinyl acetate-methyl methacrylate copolymers; water-soluble nylon; urethane resins, i.e., water-soluble polyurethane, superabsorbent polyurethane, and thermoplastic polyurethane; polyalkylene oxide resins, such as polyethylene oxide and copolymers thereof, polypropylene oxide and copolymers thereof; polyetheramide, polyether ester amide; polyvinylamine, polyallylamine, or copolymers thereof; and the like. The hydrophilic thermoplastic resins described in Kobunshi Kako, No. 9, pp. 32-38 (1984) are also useful.

Hydrophilic resins exhibiting plasticity at room temperature or higher and relatively easy to make into film are preferred. More preferred to ensure absorptivity for an aqueous solvent or aqueous ink are those resins which are capable of dissolving in water or absorbing water to become 5 or more times, particularly 8 to 50 times, as heavy as its own weight (i.e., those having a water absorption (at 30 minutes) of 5 g/g or more, particularly 8 to 50 g/g) in 30 minutes at room temperature. The water absorption (at 30 minutes) as referred to here is obtained by immersing a specimen of a hydrophilic resin having a thickness of about 0.1 mm which is prepared by T-die extrusion or hot pressing in distilled water at room temperature (e.g., 25° C.) for 30 minutes and dividing the weight after water absorption by the weight before absorption.

Natural resins which are easily affected by heat, such as gum arabic, tragacanth gum, corn starch, wheat starch, and collagen, hardly withstand the temperature at which synthetic resins are melted and are not preferred.

Particularly preferred hydrophilic thermoplastic resins are polyalkylene oxide resins which have plasticity at room temperature or higher and can be molded into film with relative ease. Polyalkylene oxide resins which are preferably used in the present invention include (i) polyester type polyalkylene oxides having an ester bond, such as reaction products between an alkylene oxide and a dibasic or polybasic acid and reaction products between a polyalkylene oxide compound and a dicarboxylic acid compound or a lower alkyl ester thereof or a carboxylic acid having three or more carboxyl groups or a lower alkyl ester compound thereof, (ii) polyurethane type polyalkylene oxides having a urethane bond, such as reaction products between a polyalkylene oxide compound and a compound having two or more isocyanate groups, (iii) polyalkylene oxides having a carbonic ester bond, such as reaction products between a polyalkylene oxide compound and a dialkyl carbonate, (iv) polyalkylene oxides having an amido bond, (v) polyalkylene oxides having a urea or thiourea bond, (vi) polyalkylene oxides having a sulfide bond or a sulfonyl bond, and (vii) polyalkylene oxides having a phosphoric ester bond or a phosphorous ester bond. Preferred of them are (i) polyalkylene oxide resins having an ester bond from the standpoint of compatibility and dispersibility with the non-hydrophilic thermoplastic resins.

The alkylene oxide includes, but are not limited to, ethylene oxide, propylene oxide, 1,2-epoxybutane, 1,2-epoxypentane, 1,2-epoxyhexane, and other α-olefin oxides having up to 30 carbon atoms, with ethylene oxide, propylene oxide, 1,2-epoxybutane and 1,2-epoxyhexane being preferred. These alkylene oxides can be used either individually or as a combination of two or more thereof. In using two or more alkylene oxides, they can be allowed to react either successively or simultaneously.

While not limiting, the polyalkylene oxide compounds preferably include homo-or copolymers of the above-described alkylene oxides having a weight average molecular weight of 5,000 to 30,000. A weight average molecular weight of 5,000 or more is desirable for film forming properties. Polyalkylene oxide compounds whose weight average molecular weight is 30,000 or less are produced with satisfactory productivity because of the relatively high reaction rate in alkylene oxide addition reaction. The polyalkylene oxide compounds are obtained by addition polymerization of alkylene oxides. For example, polyalkylene oxide compounds obtained by addition polymerizing an alkylene oxide to an organic compound having two active hydrogen atoms are preferably used.

The organic compounds having two active hydrogen atoms include, but are not limited to, ethylene glycol, diethylene glycol, propylene glycol, dipropylene glycol, 1,4-butanediol, 1,6-hexanediol, neopentyl glycol, bisphenol A, polytetramethylene glycol, alicyclic diols, e.g., cyclohexane-1,4-dimethanol, and amines, e.g., butylamine, laurylamine, octylamine, cyclohexylamine, and aniline. These compounds can be used either individually or as a combination of two or more thereof. The organic compounds having two active hydrogen atoms are preferably selected from ethylene glycol, diethylene glycol, propylene glycol, dipropylene glycol, 1,4-butanediol, and 1,6-hexanediol.

The alkylene oxide to be addition polymerized with the organic compound having two active hydrogen atoms includes, but is not limited to, ethylene oxide, propylene oxide, 1,2-epoxybutane, 1,2-epoxypentane, 1,2-epoxyhexane, and other α-olefin oxides having up to 30 carbon atoms. These alkylene oxides can be used either individually or as a combination thereof. In using two or more alkylene oxides in combination, they are allowed to react either successively or simultaneously.

Preferred polyalkylene oxide compounds are those prepared by addition polymerizing ethylene oxide to an organic compound having two active hydrogen atoms, then addition polymerizing an alkylene oxide having 4 or more carbon atoms, and finally addition polymerizing ethylene oxide. Reaction between the polyalkylene oxide compound thus prepared and a dicarboxylic acid compound provides a polyalkylene oxide resin having relatively good compatibility with non-hydrophilic resins, particularly polyolefin resins. A film prepared from a mixture of such a polyalkylene oxide resin and a polyolefin resin exhibits satisfactory ink absorptivity with improved absorption uniformity on printing.

The carboxylic acid or a lower alkyl ester compound thereof which is allowed to react with the polyalkylene oxide compound is not structurally limited provided that it has two or more, preferably two, carboxyl groups or derivatives thereof per molecule. Examples of suitable carboxylic acids and their esters include aliphatic (either straight or branched), alicyclic or aromatic di-or tricarboxylic acids having 6 to 36, preferably 8 to 24, carbon atoms, and lower alkyl esters thereof. Specific examples are sebacic acid, 1,10-decamethylenedicarboxylic acid, 1,14-tetradecamethylenedicarboxylic acid, 1,18-octadecamethylenedicarboxylic acid, 1,32-dotriacontamethylenedicarboxylic acid, cyclohexanedicarboxylic acid, phthalic acid, terephthalic acid, isophthalic acid, naphthalenedicarboxylic acid (inclusive of various isomers), 4,4'-biphenylenedicarboxylic acid, and their lower alkyl esters.

Preferred of them are saturated or unsaturated straight-chain aliphatic dicarboxylic acids having 12 to 36 carbon atoms, particularly 12 to 26 carbon atoms, especially 16 to 24 carbon atoms, and their lower alkyl esters. Specific examples of the straight-chain dicarboxylic acids having 12 to 36 carbon atoms are 1,10-decamethylenedicarboxylic acid, 1,14-tetradecamethylenedicarboxylic acid, 1,18-octadecamethylenedicarboxylic acid, and 1,32-dotriacontamethylenedicarboxylic acid. The lower alkyl esters of these dicarboxylic acids include methyl esters, dimethyl esters, ethyl esters, diethyl esters, propyl esters, and dipropyl esters. These dicarboxylic acids and their esters can be used either individually or as a combination of two or more thereof.

Particularly preferred as a hydrophilic thermoplastic resin are polyalkylene oxide resins having a weight average molecular weight of 20,000 to 200,000, particularly 80,000 to 160,000, which are obtained by copolymerizing (A) a polyalkylene oxide having a weight average molecular weight of 10,000 to 30,000 which is obtained by addition polymerizing (a) an alkylene oxide comprising ethylene oxide as a major component and a minor component selected from propylene oxide, 1,2-epoxybutane and 1,2-epoxyhexane to (b) an organic compound having two active hydrogen atoms selected from ethylene glycol, diethylene glycol, propylene glycol, dipropylene glycol, and 1,4-butanediol and (B) an aliphatic dicarboxylic acid having 12 to 36 carbon atoms or a lower alkyl ester thereof.

The porous resin film preferably comprises up to 70% by weight of an organic and/or an inorganic powder for ensuring porosity. Usually having a small specific gravity, organic powder is preferably used in an amount of 3 to 50% by weight, particularly 10 to 40% by weight. Inorganic powder is preferably used in an amount of 20 to 65% by weight, particularly 40 to 65% by weight. Porosity increases with the amount of powder added, but the upper limit of the proportion of the powder should be 70% so as to secure the film strength.

The inorganic powder includes, but is not limited to, heavy ground calcium carbonate, light precipitated calcium carbonate, flocculated precipitated calcium carbonate, silica having various pore volumes, zeolite, clay, talc, titaniumoxide, barium sulfate, zinc oxide, magnesiumoxide, diatomaceous earth, silicon oxide, and inorganic composite powder composed of a hydroxyl-containing inorganic core (e.g., silica) and an aluminum oxide or hydroxide shell. Heavy ground calcium carbonate, clay, and diatomaceous earth are preferred for inexpensiveness and pore forming properties in stretching.

In order to form pores, the organic powder is selected from resins which are incompatible with the above-described non-hydrophilic thermoplastic resin and have a higher melting point or glass transition point than the non-hydrophilic thermoplastic resin. Such resins include polyethylene terephthalate, polybutylene terephthalate, polyamide, polycarbonate, polyethylene naphthalate, polystyrene, homo-or copolymers of acrylic ester or methacrylic ester, melamine resins, polyphenylene sulfite, polyimide, polyether ether ketone, and polyphenylene sulfide. Where a polyolefin resin is used as a non-hydrophilic thermoplastic resin, polyethylene terephthalate, polybutylene terephthalate, polyamide, polycarbonate, polyethylene naphthalate or polystyrene is preferred.

Inorganic powder is preferred to organic powder in view of less heat generation on combustion.

The inorganic or organic powder preferably has an average particle size of 0.01 to 20 μm, particularly 0.1 to 10 μm, especially 0.5 to 10 μm. Particles of 0.01 μm or greater are easy to mix with the hydrophilic thermoplastic resin and the non-hydrophilic thermoplastic resin. Particles of 20 μm or smaller hardly cause troubles in stretching, such as sheet cutting or reduction in surface strength.

The particle size of the inorganic or organic powder can be obtained as, for example, a 50% diameter in a cumulative distribution measured with, for example, a laser diffraction type particle size analyzer Microtrack, supplied by Nikkiso Co., Ltd. The size of the particles dispersed by melt-kneading in a thermoplastic resin can be obtained as an average of at least 10 particles on a cut area of the porous film observed under an electron microscope.

The fine powder to be used can be of a single material or a combination of two or more materials selected from the above-described organic or inorganic powders. A combination of an organic powder and an inorganic powder is also useful.

In compounding the powder with the thermoplastic resins, additives can be added if desired. Useful additives include dispersants, antioxidants, compatibilizers, flame-retardants, UV stabilizers, and colorants. Where the porous resin film is for consumer durables, addition of an antioxidant, a UV stabilizer, etc. is recommended. In using organic powder, since the state of the powder is governed by the kind and amount of a compatibilizer used in combination, selection of the compatibilizer is of importance. Preferred compatibilizers include epoxy-modified polyolefins and maleic acid-modified polyolefins. The compatibilizer is preferably added in an amount of 0.5 to 10 parts by weight per 100 parts by weight of the organic powder.

When the hydrophilic thermoplastic resin is mixed with the non-hydrophilic thermoplastic resin and/or the inorganic and/or organic powder by melt kneading or a like method, addition of a dispersion improver is effective to improve dispersibility or dispersion stability and to reduce the difference between the maximum and the minimum surface contact angles thereby to make aqueous liquid absorption more uniform. Useful dispersion improvers include polar resins, such as epoxy-containing resins (e.g., an ethylene-glycidyl methacrylate copolymer, an ethylene-vinyl acetate-glycidyl methacrylate copolymer, glycidyl methacrylate-grafted polypropylene, and an epoxidized polybutadiene polymer), acid-modified polyolefins (e.g., maleic acid-modified polypropylene), hydroxyl-containing polyolefins (e.g., 2-hydroxyethyl methacrylate-grafted polypropylene), and amino-modified polyolefins (e.g., dimethylaminoethyl methacrylate-grafted polypropylene); and organic phosphorus compounds, such as phosphite compounds (e.g., bis(2,4-di-t-butylphenyl)pentaerythritol diphosphite, bis(2,6-di-t-butyl-4-methylphenyl)pentaerythritol diphosphite, distearylpentaerythritol diphosphite, and bis (nonylphenyl) pentaerythritol diphosphite) and phosphonite compounds (e.g., tetrakis (2,4-di-t-butylphenyl) -4,4'-bisphenylene diphosphonite).

For improving ink absorptivity, the polar resin type dispersion improver is usually added in an amount of 0.1 part by weight or more, preferably 0.5 to 30 parts by weight, more preferably 1 to 15 parts by weight, per 100 parts by weight of the non-hydrophilic thermoplastic resin, and the phosphorus type dispersion improver is usually used in an amount of 0.01 part by weight or more, preferably 0.1 to 5 parts by weight, still preferably 0.2 to 3 parts by weight, per 100 parts by weight of the non-hydrophilic thermoplastic resin.

The above-described components constituting the porous resin film are compounded at a mixing temperature and time chosen according to the properties of the components. For example, the components as dissolved or dispersed in a solvent are mixed together, or the components are melt-kneaded. Melt kneading achieves high productivity. Melt kneading is carried out by dry blending powdered or pelletized thermoplastic resins, inorganic and/or organic powder and an agent for giving hydrophilicity in a Henschel mixer, a ribbon blender, a supermixer, etc. and melt-kneading the blend in a twin-screw extruder, extruding the molten mixture into strands, which are pelletized by hot cutting or cold cutting with a strand cutter. Alternatively, the agent for giving hydrophilicity, which can be in the form of powder, liquid or a solution in water or an organic solvent, is previously mixed with the thermoplastic resin or inorganic and/or organic powder and then compounded with other components.

The screw diameter of the twin-screw extruder is subject to variation from 10 mm to 310 mm. The barrel length, which is also subject to variation, is generally such that the L/D ratio is about 60 at the most. The screws generally have alternating conveying zones and kneading zones. In the conveying zones the raw material is forwarded from each kneading zone. The kneading zone usually has a double-flighted or single-, triple- or four-flighted kneading element. A screw shear rate of 300 to 25,000 $sec^{-1}$ or more is produced in the twin-screw extruder having a screw clearance of 0.1 to 0.4 mm operated at a screw revolution speed of 100 to 1,500 rpm.

The thickness of the porous resin film is not particularly limited and can vary, for example, from 10 to 400 μm, preferably from 30 to 100 μm.

The porous resin film of the present invention can serve as it is or be combined with another thermoplastic film, laminated paper, pulp paper, nonwoven fabric, woven fabric, etc. to form a laminate. The thermoplastic film that can be laminated with the porous resin film of the invention includes transparent or opaque films of polyesters, polyamides, polyolefins, etc. In particular, the porous resin film is combined with appropriate functional layers to give recording media as demonstrated in Examples hereinafter given.

More specifically, a recording medium can be obtained by laminating a thermoplastic resin film as a base layer with the porous resin film of the invention as a surface layer. The recording medium having the porous resin film as a surface layer is especially suited for ink jet recording. The base layer includes, but is not limited to, a film comprising a polypropylene resin and inorganic fine powder. Such a recording medium composed of the porous resin film of the invention and other film suitably has a total thickness of about 50 μm to 1 mm.

The porous resin film and the recording medium according to the present invention can be produced by an appropriate combination of various techniques known to one skilled in the art. Whatever method may be used, the porous resin film and the recording medium satisfying the conditions of the present invention are included in the scope of the present invention.

The porous resin film having a liquid absorbing capacity of 0.5 ml/m² or more can be produced by any of known film formation techniques or any combination thereof. For example, stretching, calendering, blowing using a blowing agent, a method using voids-containing particles, solvent extraction, and a method comprising extracting a mixed component by dissolution can be utilized. A stretching method is preferred of these techniques.

In producing a laminate comprising a base layer and the porous resin film by stretching, a stretched or unstretched base layer can be laminated with a stretched porous resin film, or a laminate composed of the base layer and the porous resin film can be stretched. The latter method is simpler and more economical and enjoys more ease in controlling the porosity of both the porous resin film and the base layer. Where the laminate is for use as a recording medium, it is desirable to control stretching so that the porous resin film may have more pores than the base layer to serve as a surface layer with improved ink absorptivity.

Stretching can be carried out by various known methods, such as longitudinal stretching making use of peripheral speed difference among stretching rolls, lateral stretching using an oven tenter, inflation of a tubular film by use of a mandrel, and simultaneous biaxial stretching by a combination of an oven tenter and a linear motor. The stretching temperature for noncrystalline resins is set above the glass transition temperature of the thermoplastic resin used, and that for crystalline resins is set between the glass transition temperature of the non-crystalline portion and the melting point of the crystalline portion. The stretching ratio is appropriately decided according to the end use of the porous resin film or the laminate thereof, the characteristics of the thermoplastic resins used, and the like. In case of using, for instance, a propylene homo- or copolymer as a non-hydrophilic thermoplastic resin, a suitable stretching ratio in uniaxial stretching is about 1.2 to 12, preferably 2 to 10, and that in biaxial stretching is about 1.5 to 60, preferably 10 to 50, in terms of area ratio. In using other thermoplastic resins, a suitable stretching ratio in uniaxial stretching is 1.2 to 10, preferably 2 to 7, and that in biaxial stretching is 1.5 to 20, preferably 4 to 12, in terms of area ratio.

If necessary, heat treatment at high temperature can be carried out. The stretching temperature is preferably 2 to 160° C. lower than the melting point of the non-hydrophilic thermoplastic resin used. In using a propylene homo-or copolymer as a non-hydrophilic thermoplastic resin, a preferred stretching temperature is 2 to 60° C. lower than the melting point of the polymer, and a preferred stretching speed is 20 to 350 m/min.

As previously stated briefly, the stretched porous resin film of the present invention can be used either as such or as a laminate with a base layer. The base layer which can be combined with includes transparent or opaque resin films, such as a polyester film, a polyamide film, and a polyolefin film, plastic boards, pulp paper, nonwoven fabric, cloth, wood plates, metal plates, and so forth.

The resin films as a base layer can comprise a resin and inorganic and/or organic fine powder. The resin of the base layer can comprise one or more resins selected from the aforementioned non-hydrophilic thermoplastic resins or a combination of at least one of the aforesaid non-hydrophilic thermoplastic resins and at least one of the aforesaid hydrophilic thermoplastic resins. The composition of the base layer can be the same as that of the porous resins film. The resin film as a base layer may be either a stretched film or a non-stretched film.

The resin film comprising the non-hydrophilic thermoplastic resin and the hydrophilic thermoplastic resin as a base layer preferably contain 5 to 100 parts by weight of the hydrophilic thermoplastic resin per 100 parts by weight of the non-hydrophilic thermoplastic resin. A practical example of the resin film as a base layer comprises 40 to 85% by weight of the thermoplastic resin and 15 to 60% by weight of inorganic and/or organic powder. The inorganic and/or organic powder can be the same or different from that used in the surface layer (porous resin film) The inorganic and/or organic powder in the base layer can have an average particle size of 0.1 to 10 µm, preferably 0.6 to 3 µm.

While not limiting, the thickness of the base layer usually ranges from 5 to 100 µm, preferably from 20 to 500 µm. The thickness of the laminate is not limited and can arbitrarily be selected according to the use, generally ranging from 15 to 2000 µm, preferably 20 to 500 µm, still preferably 25 to 350 µm.

If desired, the porous resin film and the laminate comprising the porous resin film can be subjected to a surface oxidation treatment to improve surface hydrophilic properties, absorbing properties, affinity to an ink fixing agent or an ink receptive layer (hereinafter described), and adhesion to a base layer. Effective surface oxidation treatments include a corona discharge treatment, a flame treatment, a plasma treatment, a glow discharge treatment, an ozone treatment, and the like. A corona discharge treatment and a flame treatment are preferred. A corona discharge treatment is more preferred.

A corona discharge treatment is carried out at a discharge energy of 600 to 12,000 $J/m^2$ (10 to 200 $W \cdot min/m^2$), preferably 1,200 to 9,000 $J/m^2$ (20 to 150 $W \cdot min/M^2$). At least 600 $J/m^2$ is required for attaining sufficient effects. A discharge energy exceeding 12,000 $J/m^2$ will produce no further effects. A flame treatment is performed at an energy of 8,000 to 200,000 $J/m^2$ preferably 20,000 to 100,000 $J/m^2$. At least 8,000 $J/m^2$ is required for attaining appreciable effects. An energy exceeding 200,000 $J/m^2$ will produce no further effects.

Where the porous resin film or the laminate having the porous resin film as a surface layer is used as a recording medium, a colorant fixing layer for fixing a dye or a pigment or an ink receptive layer can be formed on the surface thereof. A colorant fixing layer or an ink receptive layer provided on the porous resin film having high water absorptivity is more effective than on a resin film having poor absorptivity in reducing feathering and improving absorptivity. Further, it is feasible to reduce the thickness of the colorant fixing layer or the ink receptive layer compared with the thickness required for a resin film having poor absorptivity. The colorant fixing layer has functions of rounding ink dots to make an image clearer and preventing a colorant from running due to water or humidity. Accordingly, it is particularly useful where the porous resin film is used as an ink jet recording medium.

The color fixing layer or ink receptive layer is formed by coating or transfer. A cationic hydrophilic resin and fine powder are preferably used to improve colorant fixing properties. For example, cationic copolymers having a cationic group, such as an amino group, a modified amino group or a quaternary ammonium base, in the main chain or side chain thereof can be used.

The ink receptive layer for ink jet recording includes a porous ink-receptive layer mainly comprising a pigment and an aqueous binder, which is used where ink is required to dry quickly, and a swelling ink-receptive layer mainly comprising an aqueous binder, which is used where high gloss is demanded.

The pigment includes synthetic silica, colloidal silica, alumina hydrosol, aluminum hydroxide, talc, calcium carbonate, clay, plastic pigments, barium sulfate, and titanium dioxide, with porous synthetic silica and alumina hydrosol being preferred. The aqueous binder includes aqueous emulsions of polyurethane resins, polyester resins, vinyl acetate resins, acrylic ester resins, styrene-acrylic ester copolymers, vinyl acetate-acrylicestercopolymers, styrene-butadiene copolymers, and methyl methacrylate-butadiene copolymers; and water-soluble polymers, such as polyvinyl alcohol, ethylene-vinyl alcohol copolymers having a silanol group, polyvinyl acetal, polyvinylpyrrolidone, methylethyl cellulose, sodium polyacrylate, starch derivatives, and gelatin derivatives. Polyvinyl alcohol or an ethylene-vinyl alcohol copolymer having a silanol group is preferred when combined with synthetic silica or alumina hydrosol.

Where the ink receptive layer is required to have ink fixing properties, an ink setting agent is incorporated. The ink setting agent includes cationic polymers, such as a tertiary ammonium salt of polyethyleneimine, an acrylic copolymer comprising a quaternary ammonium group as a copolymer component, and an epichlorohydrin adduct of polyaminepolyamide.

If desired, the colorant fixing layer or ink receptive layer can contain pigment dispersing agents, thickeners, defoaming agents, fluorescent whitening agents, UV absorbers, antioxidants, antiseptics, waterproofing agents, and the like.

The porous ink-receptive layer preferably comprises 50 to 90% by weight of the pigment, 10 to 40% by weight of the aqueous binder, and 0 to 20% by weight of the ink setting agent. The swelling ink-receptive layer preferably comprises 60 to 100% by weight of the aqueous binder and 0 to 40% by weight of the ink setting agent.

The ink receptive layer is formed by general coating techniques, such as blade coating, rod coating, wire bar coating, slide hopper coating, curtain coating, air knife coating, roll coating, and size pressing. The coating weight of the ink receptive layer is usually 0.05 to 100 $g/m^2$, preferably 0.1 to 50 $g/m^2$, while varying with required levels of ink absorptivity and gloss, the absorbing properties of the substrate, and the like. The ink receptive layer can have a single layer structure or a multiple layer structure. Two or more layers making up the ink receptive layer may have the same or different compositions and can be formed either simultaneously or successively.

The porous resin film of the invention can be printed by not only ink jet printing but other printing methods with no particular restrictions. Specifically, gravure printing using ink comprising a known vehicle having a pigment dispersed therein and other known printing methods such as aqueous flexographic printing and screen printing are applicable. The porous resin film is also printable by metal deposition, gloss printing, matte printing, etc. Patterns to be printed are selected arbitrarily from concrete patterns (e.g., animals, scenes, checks, polka dots) and abstract patterns.

The porous resin film is useful as well in the fields demanding absorptivity for aqueous liquids. Such applications include adhesive labels with aqueous self-adhesive, labels for containers such as bottles and cans, water-absorbing films, wallpaper, decorative paper of plywood or plasterboard, anti-fogging films, drip-proof wrapping paper for food, coasters, paper for handicrafts, paper for origami, water retentive sheets, sheets for protecting soil from drying, assisting materials for concrete drying, desiccants, dehumidifiers, and so forth.

The present invention will now be illustrated in greater detail with reference to Examples, Comparative Examples, and Test Examples. The quantities, ratios, operations and the like hereinafter described are subject to modification within the scope and the spirit of the present invention. Accordingly, it should be understood that the present invention is not construed as being limited to these Examples. Unless otherwise noted, all the parts and percents are by weight.

EXAMPLE 1

Preparation of Base Layer and Longitudinal Stretching:

Composition A consisting of 75% of polypropylene having a melt flow rate (MFR; 230° C., 2.16 kg load) of 1 g/10 min, 5% of high-density polyethylene having an MFR (190° C., 2.16 kg load) of 8 g/10 min, and 20% of calcium carbonate having an average particle size of 3 μm was melt-kneaded in an extruder set at 250° C., extruded into strands, and cut into pellets.

The resulting compound A was extruded from an extruder set at 250° C. through a T-die, and the extruded sheet was chilled on a chill roll to obtain an unstretched sheet. The unstretched sheet was heated to 140° C. and longitudinally stretched 4.5 times to obtain a stretched sheet.

In melt-kneading resin components or a mixture of resin components and fine powder in this and other Examples, 0.2 part of 4-methyl-2,6-di-t-butylphenol (antioxidant) and 0.1 part of Irganox 1010 (phenolic antioxidant, available from Ciba-Geigy Ltd.) were added per 100 parts of the total of the resin components and the powder.

Formation of porous resin film laminate (recording medium):

Composition B consisting of 30% of polypropylene having an MFR of 5 g/10 min (hereinafter abbreviated as PP1), 12% of a polyalkylene oxide resin (an ester of (i) an ethylene oxide (about 90%) -butylene oxide (about 10%) copolymer having a weight average molecular weight of about 20,000 and (ii) octadecamethylenedicarboxylic acid; water absorption (at 30 minute): 14 g/g; hereinafter abbreviated as PEPO1), and 58% of calcium carbonate having an average particle size of 3 μm (hereinafter abbreviated as CC1) was melt kneaded in a twin-screw extruder TEX65 (screw diameter: 65 mm) having a screw clearance of about 0.4 mm at a screw shear rate of 3000 $sec^{-1}$ to prepare compound B.

Compound B was extruded from an extruder set at 240° C. (temperature a). The extruded sheet was superposed on each side of the above-prepared 4.5-fold stretched sheet, and the laminate was cooled to 55° C. (temperature b). The laminate was heated to 156° C. (temperature c) and stretched 8 times in the lateral direction by means of a tenter, annealed at 157° C. temperature d), and cooled to 50° C. (temperature e), followed by trimming to obtain a porous resin film laminate (recording medium) composed of a surface absorbing layer B (70 μm) /base layer A (40 μm) /back absorbing layer B (20 μm) having a total thickness of 130 μm.

The particle size of the calcium carbonate powder used in Examples is a cumulative 50% diameter measured with Microtrack (laser diffraction type particle size analyzer, supplied by Nikkiso Co., Ltd.).

Evaluation:

The following evaluation was carried out on the surface absorbing layer B side of the laminate.

(1) Liquid Absorbing Capacity

The liquid absorbing capacity was measured according to Japan TAPPI Standard, No. 51-87 (Pater Pulp Test No. 51-87 (Bristow's method) with a liquid absorption tester supplied by Kumagaya Riki Kogyo K. K. by using a water/ethylene glycol mixed solvent (70/30 by weight) containing 2 parts of Malachite Green as a staining dye per 100 parts of the mixed solvent. The liquid absorbing capacity at 2 seconds of the porous resin film was 7.3 ml/m².

(2) Average Contact Angle With Water and Maximum-Minimum Difference of Water Contact Angle The water contact angle of the surface of the porous resin film was measured with a contact angle meter CA-D, supplied by Kyowa Kaimen Kagaku K.K. 1 minute after dropping pure water on the film surface. The measurement was repeated 10 times using an intact film for every measurement to obtain an average (n=10) and a difference between the maximum and the minimum contact angles.

(3) Confirmation of Surface Pores and Measurement of the Number of Surface Pores A cut piece of the porous resin film was observed to confirm the existence of pores on the surface and on the cut area. A piece cut out of an arbitrary part of the porous film was fixed on a mount. The surface to be observed was metallized and observed under a scanning electron microscope S-2400, supplied by Hitachi, Ltd., at 500 times magnification to confirm existence of pores on the surface. Further, the electron microscopic image was output on heat-sensitive recording paper or photographed. The number of the pores on the surface was found to be about $1.0 \times 10^9/m^2$.

(4) Confirmation of Internal Pores and Measurement of Internal Porosity

The porous resin film laminate was embedded in an epoxy resin and sliced with a microtome in the direction parallel to the thickness direction and perpendicular to the planar direction. The cut area was metallized and observed under a scanning electron microscope S-2400, supplied by Hitachi, Ltd., at 2000 times magnification to confirm existence of internal pores (voids)

The microscopic image of the observed field was output on heat-sensitive recording paper, and the thickness of each layer was measured. The total thickness and the total basis weight (g/m²) of the laminate were measured. The surface absorbing layer was stripped off over a given area, and the thickness and basis weight of the remaining film were measured. From the differences were obtained the thickness and basis weight (g/m²) of the porous resin film, and the basis weight was divided by the thickness to give the density (ρ) of the absorbing layer. Separately, compound B was pressed into a 1 mm thick sheet at 230° C., and the density (ρ₀) was measured. The porosity was calculated according to equation:

$$\text{Porosity (\%)} = (\rho_0 - \rho)/\rho_0 \times 100$$

wherein $\rho_0$ is the true density of the porous resin film; and $\rho$ is the density of the porous resin film.

(5) Ink Absorptivity

Color charts for evaluation (2 cm by 2 cm; printed in monochrome at 50% or 100% density; or overprinted at 200% density) were prepared and reproduced on the recording medium (surface layer of the porous resin film laminate) by ink jet printing using an ink jet printer JP2115, supplied by Graphtec Corp., and pigment inks (yellow, magenta, cyan, and black). Filter paper was pressed onto the printed area at regular intervals to see whether ink was transferred to the filter paper. The time when the ink was no more transferred was recorded. The ink absorptivity of the absorbing layer was evaluated according to the following rating system.

6 . . . The ink is not transferred immediately after printing.
    5 . . . The ink is not transferred after 1 minute or shorter from printing.
    4 . . . The ink is not transferred after 2 minutes or shorter from printing.
    3 . . . The ink is not transferred after 3 minutes or shorter from printing.
    2 . . . The ink is not transferred after 4 minutes or shorter from printing.
    1 . . . The ink is not transferred after 5 minutes or shorter from printing.
    0 . . . The ink does not dry and is transferred after more than 5 minutes from printing.

Further, the printed area after ink absorption was observed with the naked eye to evaluate density unevenness according to the following rating system.

4 . . . No density unevenness is observed.
    3 . . . Little density unevenness is observed.
    2 . . . Density unevenness is observed.
    1 . . . Appreciable density unevenness is observed.

Feathering after ink absorption was observed with the naked eye and rated as follows.

4 . . . The image is clear with no feathering.
    3 . . . The image has little feathering and is distinguishable almost satisfactorily.
    2 . . . The image has feathering to impair distinguish ability.
    1 . . . The image is useless, suffering from considerable feathering.

After completion of printing, the printed sheets were allowed to stand in a room for 1 hour. After the standing, the printed surface was observed with the naked eye to see whether surface unevenness developed, which was rated as follows.

3 . . . The printed surface is even with non-printed area.
    2 . . . The printed sheet has little surface unevenness.
    1 . . . The printed sheet has appreciable surface unevenness.

The results of evaluation are shown in Table 1 below.

COMPARATIVE EXAMPLE 1

A porous resin film and a laminate thereof were prepared and evaluated in the same manner as in Example 1, except for using 40% of PP-1 as a non-hydrophilic thermoplastic resin and 60% of CC1 as fine powder in place of composition B. The porous resin film scarcely absorbed water at 2 seconds so that its liquid absorbing capacity was regarded to be 0 ml/m². The results of other evaluation items are shown in Table 1.

COMPARATIVE EXAMPLE 2

A porous resin film and a laminate thereof were prepared and evaluated in the same manner as in Example 1, except that 30% of PEPO1 as a hydrophilic thermoplastic resin and 70% of PP-1 as a non-hydrophilic thermoplastic resin were used in place of compositions and that tentering of the laminate was not carried out. The resulting resin film scarcely absorbed water at 2 seconds so that its liquid absorbing capacity was regarded to be 0 ml/m². The results of other evaluation items are shown in Table 1.

EXAMPLES 2 TO 5

A porous resin film and a laminate thereof were prepared and evaluated in the same manner as in Example 1, except for changing the screw shear rate of the twin-screw extruder (TEX65 or TEX30) as shown in Table 1. The results of evaluation are shown in Table 1.

EXAMPLE 6

A porous resin film and a laminate thereof were prepared and evaluated in the same manner as in Example 1, except that a composition consisting of 40% of PEPO1 as a hydrophilic resin and 60% of PP-1 as non-hydrophilic thermoplastic resin was kneaded in a twin-screw extruder TEM47 having a screw diameter of 47 mm and a screw clearance of about 0.2 mm at a screw shear rate of 5000 sec$^{-1}$ and that temperatures a to e were changed as shown in Table 1. The results of evaluation are shown in Table 1.

COMPARATIVE EXAMPLE 3

A porous resin film and a laminate thereof were prepared and evaluated in the same manner as in Example 1, except for changing the screw shear rate of the twin-screw extruder (TEX30; screw diameter: 30 mm) to 100 sec$^{-1}$. The results of evaluation are shown in Table 1.

EXAMPLE 7

A mixture of 75% of polypropylene having an MFR of 1 g/10 min and 5% of high-density poly ethylene having an MFR (190° C., 2.16 kg load) of 10 g/10 min was mixed with 20% of CC1 (inorganic powder), and the blend was kneaded in an extruder, extruded into strands, and pelletized to obtain compound C.

A mixture of 40% of PP1, 10% of PEPO1 resin, and 50% of CC1 was melt kneaded in a twin-screw extruder TEX65 set at a temperature of 230° C. at a screw shear rate of 2200 sec$^{-1}$ to prepare compound D in the form of pellets.

Compound C and compound D were melted in separate extruders, laminated in the same T-die, co-extruded, and chilled to obtain an unstretched laminate sheet having a layer of compound D on both sides of a layer of compound C. The sheet was heated to 143° C. and stretched 4.5 times in the longitudinal direction, followed by cooling. The stretched sheet was again heated to 154° c. (temperature c) and stretched 8 times in the lateral direction by means of a tenter, annealed at 155° C. (temperature d), chilled to 50° C. (temperature e), and trimmed to obtain a porous resin film laminate composed of a surface absorbing layer D (50 μm)/base layer C (30 μm)/back absorbing layer D (30 μm) having a total thickness of 110 μm.

The resulting laminate was evaluated in the same manner as in Example 1 The results obtained are shown in Table 1.

COMPARATIVE EXAMPLE 4

Both sides of the laminate prepared in Comparative Example 1 were subjected to a corona discharge treatment at an energy of 4800 J/m$^2$ (80 W•min/m$^2$). The treated laminate

TABLE 1

| | Ex.1 | Comp. Ex. 1 | Comp. Ex. 2 | Ex. 2 | Ex. 3 | Ex. 4 | Ex. 5 | Ex. 6 | Comp. Ex. 3 | Ex. 7 |
|---|---|---|---|---|---|---|---|---|---|---|
| Hydrophilic Thermoplastic Resin: | | | | | | | | | | |
| Kind | PEP01 | — | PEP01 | PEP01 | PEP01 | PEP01 | PEP01 | PEP01 | PEP01 | PEP01 |
| Water absorption (at 30 sec) [g/g] | 14 | — | 14 | 14 | 14 | 14 | 14 | 14 | 14 | 14 |
| Amount (%/part) | 12/43 | — | 30/43 | 12/43 | 12/43 | 12/43 | 12/43 | 40/67 | 12/43 | 10/25 |
| Non-hydrophilic Thermoplastic Resin: | | | | | | | | | | |
| Kind | PP1 | PP1 | PP1 | PP1 | PP1 | PP1 | PP1 | PP1 | PP1 | PP1 |
| Amount (%/part) | 30/100 | 40/100 | 70/100 | 30/100 | 30/100 | 30/100 | 30/100 | 60/100 | 30/100 | 40/100 |
| Fine Powder: | | | | | | | | | | |
| Kind | CC1 | CC1 | — | CC1 | CC1 | CC1 | CC1 | — | CC1 | CC1 |
| Particle size (μm) | 3 | 3 | — | 3 | 3 | 3 | 3 | — | 3 | 3 |
| Amount (%) | 58 | 60 | — | 58 | 58 | 58 | 58 | — | 58 | 50 |
| Kneading Step: | | | | | | | | | | |
| Twin-screw extruder | TEX65 | TEX65 | TEX65 | TEX65 | TEX65 | TEX65 | TEX30 | TEX47 | TEX30 | TEX65 |
| Screw clearance (nm) | 0.4 | 0.4 | 0.4 | 0.4 | 0.4 | 0.4 | 0.4 | 0.2 | 0.4 | 0.4 |
| Screw shear rate (1/sec) | 3000 | 3000 | 3000 | 8500 | 5000 | 800 | 400 | 18500 | 100 | 2200 |
| Molding Step: | | | | | | | | | | |
| Temperature a (° C.) | 240 | 240 | 240 | 240 | 240 | 240 | 240 | 240 | 240 | — |
| Temperature b (° C.) | 55 | 55 | 50 | 55 | 55 | 55 | 55 | 55 | 55 | 55 |
| Temperature c (° C.) | 156 | 155 | — | 156 | 156 | 156 | 156 | 154 | 156 | 154 |
| Temperature d (° C.) | 157 | 155 | — | 157 | 157 | 157 | 157 | 155 | 157 | 155 |
| Temperature e (° C.) | 50 | 50 | — | 50 | 50 | 50 | 50 | 50 | 50 | 50 |
| Thickness of Laminate (μm) | 130 | 146 | 356 | 130 | 130 | 130 | 130 | 110 | 130 | 110 |
| Thickness of Surface Layer (μm) | 70 | 65 | 70 | 70 | 70 | 70 | 70 | 40 | 70 | 50 |
| Thickness of Base Layer (μm) | 40 | 40 | 255 | 40 | 40 | 40 | 40 | 40 | 40 | 30 |
| Liquid Absorbing Capacity at 2 second (ml/n$^2$) | 7.3 | 0 | 0 | 8.0 | 7.6 | 6.5 | 5.8 | 5.6 | 2.2 | 7.2 |
| Average Water Contact Angle (°) | 90 | 115 | 33 | 88 | 90 | 93 | 95 | 76 | 93 | 96 |
| Difference between Max. and Min. Water Contact Angles (°) | 7 | 3 | 5 | 4 | 9 | 13 | 19 | 9 | 40 | 6 |
| Internal Porosity (%) | 58 | 50 | 0 | 58 | 58 | 58 | 58 | 48 | 40 | 63 |
| Number of Surface Pores (/m$^2$) | 1.0E + 9 | 2.2E + 10 | 0 | 1.0E + 9 | 1.0E + 9 | 1.0E + 9 | 1.0E + 9 | 9.2E + 8 | 7.6E + 8 | 7.6E + 9 |
| Ink Absorptivity: | | | | | | | | | | |
| Monochrome 50% | 6 | 0 | 0 | 6 | 6 | 6 | 6 | 6 | 4 | 6 |
| Monochrome 100% | 6 | 0 | 0 | 6 | 6 | 6 | 5 | 6 | 3 | 6 |
| Overprint 200% | 6 | 0 | 0 | 6 | 6 | 6 | 4 | 6 | 1 | 6 |
| Density Unevenness | 4 | 1 | 1 | 4 | 4 | 4 | 3 | 4 | 1 | 4 |
| Feathering | 3 | 1 | 1 | 3 | 3 | 3 | 3 | 3 | 1 | 3 |
| Surface Unevenness after Printing | 3 | 3 | 3 | 3 | 3 | 3 | 3 | 3 | 3 | 3 |

EXAMPLE 8

Both sides of the laminate prepared in Example 1 were subjected to a corona discharge treatment at an energy of 4800 J/m$^2$ (80 W•min/m$^2$). The treated laminate was evaluated in the same manner as in Example 1. The results obtained are shown in Table 2 below.

was evaluated in the same manner as in Example 1. The results obtained are shown in Table 2 below.

EXAMPLE 9

One side (surface absorbing layer B) of the laminate prepared in Example 1 was subjected to a corona discharge treatment at an energy of 4800 J/m$^2$. The treated side was coated with an ink receptive coating composition having the following formulation to a coating weight of 5 g/m² on a solid basis, dried, and super calendered to obtain ink jet recording paper.

Ink Receptive Coating Composition:
- Synthetic silica powder (Mizucasil P-78D, available from Mizusawa Industrial Chemicals, Ltd.) 100 parts
- Polyvinyl alcohol (PVA-117, available from Kuraray Co., Ltd.) 30 parts
- Polyaminepolyamide-epichlorohydrin adduct (WS-570, available from Japan PMC Corp.) 10 parts
- Sodium polyacrylate (reagent grade, available from Wako Pure Chemical Industries, Ltd.) 5 parts
- Water 1600 parts The resulting recording paper was evaluated in the same manner as in Example 1. The results obtained are shown in Table 2.

EXAMPLE 10

One side (surface absorbing layer B) of the laminate prepared in Example 1 was subjected to a corona discharge treatment at an energy of 4800 J/m². The treated side was coated with an ink receptive coating composition having the following formulation to a coating weight of 5 g/m² on a solid basis and dried to obtain ink jet recording paper.

Ink Receptive Coating Composition:
- Alumina sol (Alumina Sol 100, available from Nissan Chemical Industries, Ltd.; solid content: 10%) 100 parts
- Polyvinyl alcohol (PVA-117, available from Kuraray Co., Ltd.) 10 parts
- Water 100 parts The resulting recording paper was evaluated in the same manner as in Example 1. The results obtained are shown in Table 2.

EXAMPLE 11

Ink jet recording paper was prepared and evaluated in the same manner as in Example 10, except for using the following ink receptive coating composition. The results obtained are shown in Table 2.

Ink Receptive Coating Composition:
- Urethane binder (SF Coating 8310, available from Dainippon Ink & Chemicals, Inc.; solid content: 13%) 100 parts
- Polyamidine (Himax SC700L, available from Hymo Co., Ltd.; solid content: 30%) 2 parts

COMPARATIVE EXAMPLE 5

Commercially available ink jet recording paper having a pulp paper base (MJA4SP1 exclusive for Epson Superfine) was evaluated in the same manner as in Example 1. The results are shown in Table 2.

TABLE 2

|  | Example 8 | Compara. Example 4 | Example 9 | Example 10 | Example 11 | Compara. Example 5 |
|---|---|---|---|---|---|---|
| Base or Substrate | Example 1 | Compara. Example 1 | Example 1 | Example 1 | Example 1 | pulp-based paper for ink jet printer |
| Surface Oxidation Treatment | corona treatment | corona treatment | corona treatment | corona treatment | corona treatment | |
| Surface Oxidation Energy (J/m²) | 4800 | 4800 | 4800 | 4800 | 4800 | |
| Liquid Absorbing Capacity (at 2 sec) after Surface Oxidation Treatment (ml/m²) | 7.4 | 0 | 7.4 | 7.4 | 7.4 | |
| Water Contact Angle after Surface Oxidation Treatment (°) | 58 | 75 | 58 | 58 | 58 | |
| Difference between Max. and Min. Water Contact Angles after Surface Oxidation Treatment (°) | 4 | 3 | 4 | 4 | 4 | |
| Solid Content of Ink Receptive Layer (g/m²) | — | — | 5 | 5 | 5 | |
| Ink Absorptivity: | | | | | | |
| 50% Monochrome | 6 | 0 | 6 | 6 | 6 | 6 |
| 100% Monochrome | 6 | 0 | 6 | 6 | 6 | 6 |
| 200% Overprint | 6 | 0 | 6 | 6 | 6 | 6 |
| Density Unevenness | 4 | 3 | 4 | 4 | 4 | 4 |
| Feathering | 3 | 1 | 4 | 4 | 4 | 4 |
| Surface Unevenness after Printing | 3 | 3 | 3 | 3 | 3 | 1 |

As is apparent from the results shown in Tables 1 and 2, the porous resin films according to the present invention exhibit extremely excellent ink absorptivity, causing no density unevenness even where the ink is ejected in large quantities. The comparative films whose liquid absorption is out of the range specified in the present invention (Comparative Examples 1 and 2) show poor ink absorbing properties. The film of Comparative Example 3, in which the screw shear rate in melt kneading was out of the range specified in the present invention, caused density unevenness.

As is apparent from the results of Examples 9 to 11, the porous films having an ink receptive layer exhibit excellent ink absorptivity, demonstrating the effects of the present invention. Comparisons between Examples and Comparative Example 5 clearly reveal that the porous films of the invention do not develop surface unevenness after printing.

While the invention has been described in detail and with reference to specific examples thereof, it will be apparent to one skilled in the art that various changes and modifications can be made therein without departing from the spirit and scope thereof.

What is claimed is:

1. A self-supporting stretched porous resin film which is obtained from a compound prepared by kneading a composition consisting essentially of 30 to 100% by weight of a thermoplastic resin comprising 5 to 100 parts by weight of a hydrophilic thermoplastic resin per 100 parts by weight of a non-hydrophilic thermoplastic resin and 0 to 70% by weight of at least one of an inorganic fine powder and an organic fine powder in an intermeshing twin-screw extruder at a screw shear rate of 300 $sec^{-1}$ or higher and which has a liquid absorbing capacity of 3 to 2600 ml/m$^2$ as measured in accordance with the method specified in Japan TAPPI Standard No. 51-87.

2. The porous resin film according to claim 1, which has an average contact angle of 110° or less with water.

3. The porous resin film according to claim 2, wherein the difference between the maximum and the minimum contact angles with water is 30° or less.

4. The porous resin film according to claim 1, which has a porosity of 10% or more.

5. The porous resin film according to claim 4, which has 1×10$^6$ or more pores per m$^2$ on the surface thereof.

6. The porous resin film according to claim 1, wherein said inorganic or organic powder has an average particle size of 0.01 to 20 µm.

7. The porous resin film according to claim 1, wherein said non-hydrophilic thermoplastic resin is a polyolefin resin.

8. The porous resin film according to claim 1, wherein said hydrophilic thermoplastic resin is capable of dissolving in water or absorbing 5 g/g or more of water in 30 minutes.

9. The porous resin film according to claim 8, wherein said hydrophilic thermoplastic resin is an alkylene oxide polymer.

10. The porous resin film according to claim 9, wherein said alkylene oxide polymer is a reaction product of an alkylene oxide compound and a dicarboxylic acid compound.

11. A laminate comprising a base layer having on at least one side thereof the porous resin film set forth in claim 1.

12. A liquid absorber comprising the laminate set forth in claim 11.

13. A recording medium comprising the laminate set forth in claim 11.

14. An ink jet recording medium comprising the laminate set forth in claim 11.

15. An ink jet recording medium comprising the laminate set forth in claim 11 and a colorant fixing layer provided on the porous resin film provided on one side of said base layer or on both the porous films provided on both sides of said base layer.

16. A liquid absorber comprising the porous resin film set forth in claim 1.

17. A recording medium comprising the porous resin film set forth in claim 1.

18. An ink jet recording medium comprising the porous resin film set forth in claim 1.

19. An ink jet recording medium comprising the porous resin film set forth in claim 1 and a colorant fixing layer provided on at least one side of said porous resin film.

* * * * *